US012693471B2

(12) United States Patent
Lee et al.

(10) Patent No.: US 12,693,471 B2
(45) Date of Patent: Jul. 28, 2026

(54) PHOTONIC PACKAGE AND METHOD FOR FORMING THE SAME

(71) Applicant: TAIWAN SEMICONDUCTOR MANUFACTURING COMPANY LTD., Hsinchu (TW)

(72) Inventors: Kuo-Hao Lee, Hsinchu (TW); Xin-Hua Huang, Changhua County (TW); Jung-Kuo Tu, Hsinchu City (TW); Kejun Xia, Hsinchu City (TW); Tse-En Chang, Hsinchu City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 361 days.

(21) Appl. No.: 18/325,219

(22) Filed: May 30, 2023

(65) Prior Publication Data

US 2024/0402441 A1      Dec. 5, 2024

(51) Int. Cl.
| | |
|---|---|
| *G02B 6/124* | (2006.01) |
| *G02B 6/12* | (2006.01) |
| *G02B 6/30* | (2006.01) |
| *G02B 6/34* | (2006.01) |
| *G02B 6/42* | (2006.01) |

(52) U.S. Cl.
CPC .............. *G02B 6/124* (2013.01); *G02B 6/34* (2013.01); *G02B 6/4204* (2013.01); *G02B 6/4215* (2013.01); *G02B 6/4274* (2013.01); *G02B 6/428* (2013.01); *G02B 6/4283* (2013.01); *G02B 2006/12107* (2013.01); *G02B 6/30* (2013.01); *G02B 6/4214* (2013.01)

(58) Field of Classification Search
CPC ......... G02B 6/124; G02B 2006/12107; G02B 6/34; G02B 6/12002; G02B 2006/12061; G02B 6/136; G02B 6/13; G02B 6/4214; G02B 2006/12147; G02B 6/122; G02B 6/4274; G02B 2006/12176; G02B 6/132; G02B 2006/12104; G02B 6/428
See application file for complete search history.

(56) References Cited

U.S. PATENT DOCUMENTS

| | | | |
|---|---|---|---|
| 2013/0015546 A1* | 1/2013 | Joe ......................... | G02B 6/124 257/E31.127 |
| 2021/0091056 A1* | 3/2021 | Yu ......................... | G02B 6/4214 |
| 2021/0271023 A1* | 9/2021 | Chang ..................... | H01L 23/48 |

* cited by examiner

*Primary Examiner* — Michelle R Connelly
(74) *Attorney, Agent, or Firm* — WPAT LAW; Athony King

(57) ABSTRACT

A photonic package includes an optical die and an electronic die. The optical die has a first side and a second side opposite to the first side. The optical die includes a first grating coupler, a second grating coupler separated from the first grating coupler and an interconnect structure disposed over the first side. The first grating coupler includes a plurality of first segments disposed over the first side, and the second grating coupler includes a plurality of second segments disposed over the first side. The first segments and the second segments include a same material. The interconnect structure is disposed between the electronic die and the optical die. The optical die and the electronic die are electrically connected to each other through the interconnect structure. The first segments are in contact with the interconnect structure, and the second segments are separated from the interconnect structure.

20 Claims, 9 Drawing Sheets

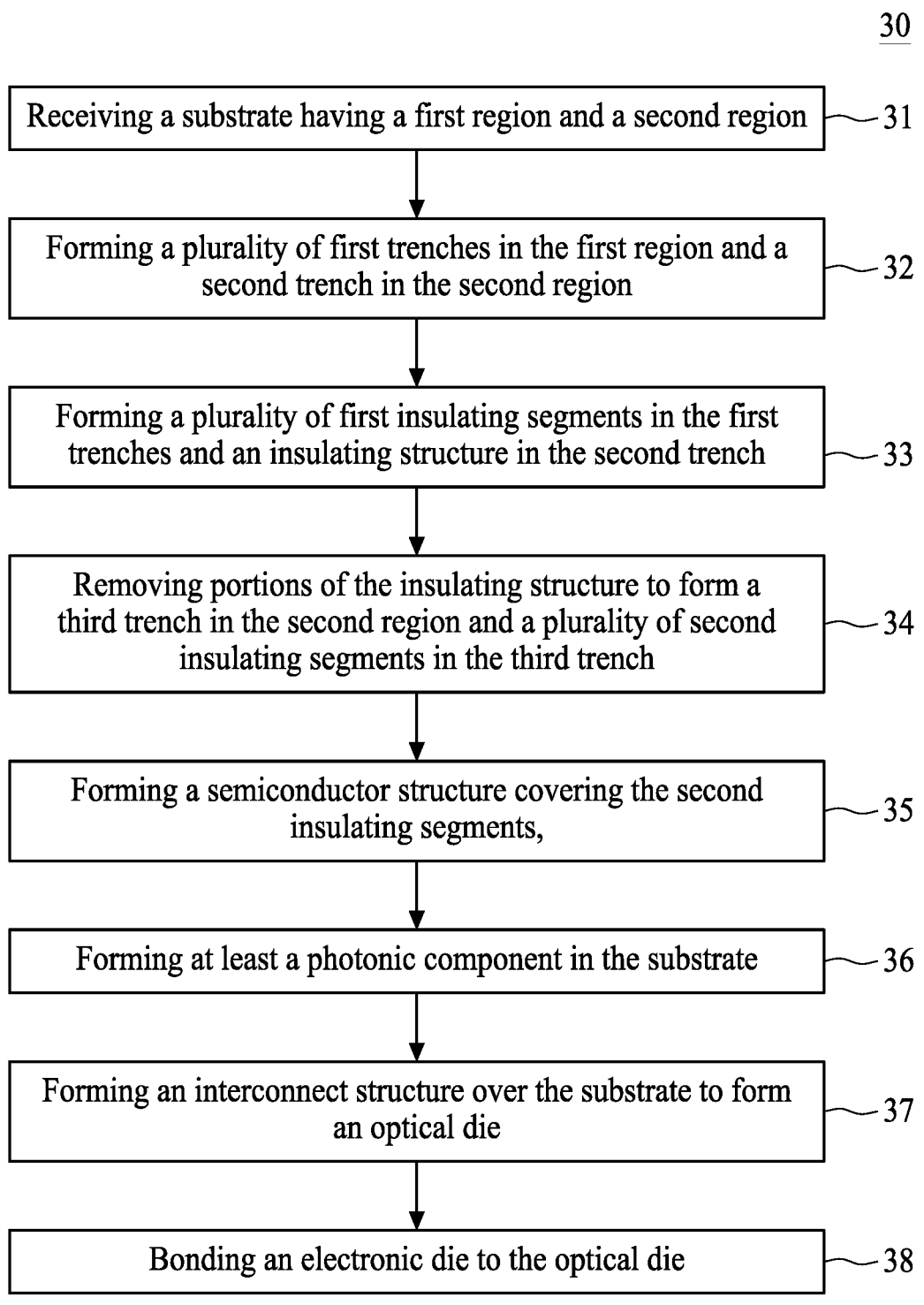

30

Receiving a substrate having a first region and a second region —— 31

Forming a plurality of first trenches in the first region and a second trench in the second region —— 32

Forming a plurality of first insulating segments in the first trenches and an insulating structure in the second trench —— 33

Removing portions of the insulating structure to form a third trench in the second region and a plurality of second insulating segments in the third trench —— 34

Forming a semiconductor structure covering the second insulating segments, —— 35

Forming at least a photonic component in the substrate —— 36

Forming an interconnect structure over the substrate to form an optical die —— 37

Bonding an electronic die to the optical die —— 38

FIG. 7

PHOTONIC PACKAGE AND METHOD FOR FORMING THE SAME

BACKGROUND

Optical signaling and processing have been increasingly used in recent years for signal transmission and processing in optical fiber-related applications.

Optical signaling and processing are often combined with electrical signaling and processing for signal transmission. For example, optical fibers are used for long-range signal transmission, while electrical signals are used for short-range signal transmission as well as processing and controlling. Accordingly, devices that include integrated optical components and electrical components are used for conversion between optical signals and the electrical signals, as well as processing of the optical signals and the electrical signals.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a flowchart representing a method for forming a semiconductor package structure according to aspects of the present disclosure.

DETAILED DESCRIPTION

Figure 1A:
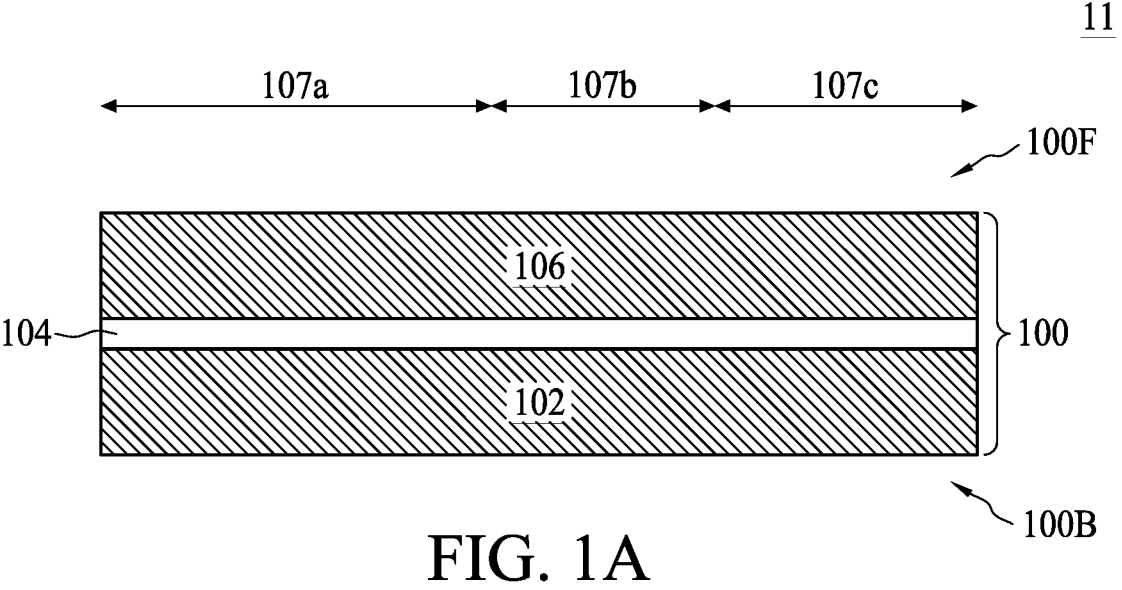
FIGS. 1A to 1F are schematic cross-sectional partial views of various stages in a formation of a photonic package according to aspects of the present disclosure in one or more embodiments.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper," "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although the terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective test measurements. Also, as used herein, the terms "substantially," "approximately" or "about" generally mean within a value or range that can be contemplated by people having ordinary skill in the art. Alternatively, the terms "substantially," "approximately" or "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

In the present disclosure, various aspects of a photonic package and a formation method thereof. Three-dimensional (3D) packages including both optical devices and electrical devices and methods of forming the same are provided, in accordance with some embodiments. In some embodiments, an inverse grating coupler is formed such that optical testing and electrical testing can be performed on a same side of the photonic package at a wafer level. Accordingly, manufacturing operations and manufacturing yield can be effectively monitored. Intermediate stages of forming the photonic packages are illustrated, in accordance with some embodiments. Some variations of some embodiments are discussed. Throughout the various descriptions and illustrations, like reference numbers are used to designate like elements.

FIGS. 1A to 1F are schematic cross-sectional views of various stages in a formation of a photonic package according to aspects of the present disclosure in one or more embodiments. The corresponding operations are also reflected schematically in a process flow shown in FIG. 7.

Referring to FIG. 1A, in some embodiments, a substrate 100 is received or provided. In some embodiments, the substrate 100 may be a silicon-on-insulator (SOI) substrate. The SOI substrate may include an insulating layer 104 over a bulk substrate 102, and a semiconductor layer 106 over the insulating layer 104. The bulk substrate 102 may include, for example, a material such as glass, ceramic, dielectric, a semiconductor, the like, or a combination thereof. In some embodiments, the bulk substrate 102 is a semiconductor substrate, which may be doped or undoped. In some embodiments, the semiconductor substrate may include silicon, germanium, a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. In some embodiments, a thickness of the bulk substrate 102 may be greater than approximately 750 micrometers (μm), but the disclosure is not limited thereto. The insulating layer 104 may include, for example, a silicon oxide or the like. In some embodiments, the insulating layer 104 may have a thickness between approximately 0.5 μm and approximately 3 μm, but the disclosure is not limited thereto. The semiconductor layer 106 may be a silicon layer, and the silicon layer may be an epitaxial silicon layer, but the disclosure is not limited thereto. A thickness of the semiconductor layer 106 may be between approximately 1,500 angstroms and approximately 3,000 angstroms, but the disclosure is not limited thereto. The substrate 100 has a front side 100F and a back side 100B, as shown in FIG. 1A. In some embodiments, the substrate 100 may be defined to have different regions. For example, the substrate 100 may have a region 107a for accommodating a waveguide or other photonic components, a region 107b for accommodating a grating coupler, and a region 107c for accommodating another grating coupler.

Figure 1B:
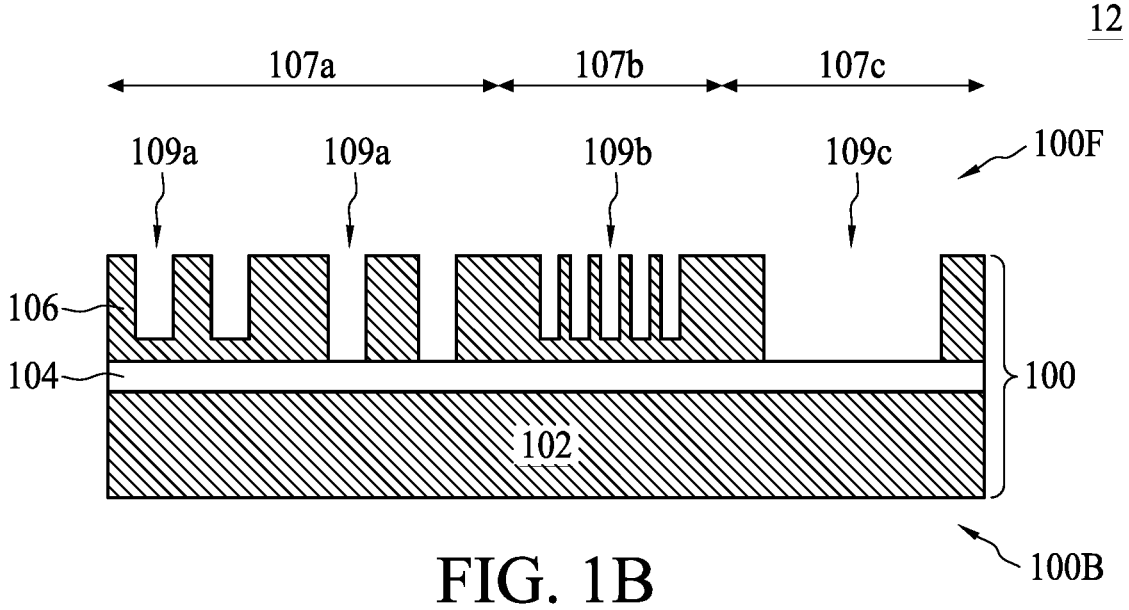

Referring to FIG. 1B, in some embodiments, the semiconductor layer 106 is patterned using suitable photolithography and etching operations. The etching operation may include, for example but not limited thereto, a dry etching and/or a wet etching. In some embodiments, multiple photolithography and etching operations may be used to pattern the semiconductor layer 106. Accordingly, a plurality of trenches 109a are formed in the semiconductor layer 106 in the region 107a, a plurality of trenches 109b are formed in the semiconductor layer 106 in the region 107b, and at least a trench 109c is formed in the region 107c. In some embodiments, the trenches 109a may be used to define regions for accommodating various photonic components to be formed in the region 107a; therefore, widths and depths of the trenches 109a in the region 107a may vary for different device designs.

The photonic component may be optically coupled to the waveguides to interact with optical signals within the waveguides. The photonic components may include, for example, photonic devices such as photodetectors and/or modulators. For example, a photodetector may be optically coupled to the waveguides to detect optical signals within the waveguides and generate electrical signals corresponding to the optical signals. A modulator may be optically coupled to the waveguides to receive electrical signals and generate corresponding optical signals within the waveguides by modulating optical power within the waveguides. In such manner, the photonic components facilitate input/output (I/O) of optical signals to and from the waveguides. In other embodiments, the photonic components may include other active or passive components, such as laser diodes, optical signal splitters, or other types of photonic structures or devices. Optical power may be provided to the waveguides by, for example, an optical fiber coupled to an external light source, or the optical power may be generated by a photonic component within the photonic package, such as a laser diode.

In some embodiments, the photodetectors may be formed by, for example, partially etching regions of the waveguides and growing an epitaxial material on remaining silicon of the partially-etched regions. The waveguides may be etched using acceptable photolithography and etching techniques. The epitaxial material may comprise, for example, a semiconductor material such as germanium (Ge), which may be doped or undoped. In some embodiments, an implantation process may be performed to introduce dopants into the silicon of the etched regions as part of the formation of the photodetectors. The silicon of the etched regions may be doped with p-type dopants, n-type dopants, or a combination thereof. In some embodiments, the modulators may be formed by, for example, partially etching regions of the waveguides and then implanting appropriate dopants within the remaining silicon of the etched regions. The waveguides may be etched using acceptable photolithography and etching techniques. In some embodiments, the etched regions used for the photodetectors and the partially-etched regions used for the modulators may be formed using one or more of the same photolithography or etching steps. The silicon of the etched regions may be doped with p-type dopants, n-type dopants, or a combination thereof. In some embodiments, the etched regions used for the photodetectors and the etched regions used for the modulators may be implanted using one or more of the same implantation steps.

In some embodiments, depths of the trenches 109b are less than a depth of the trench 109c, and widths of the trenches 109b are less than a width of the trench 109c. In some embodiments, the semiconductor layer 106 is exposed through bottoms and sidewalls of the trenches 109b. In the region 107c, the semiconductor layer 106 is exposed through sidewalls of the trench 109c, while the insulating layer 104 is exposed through a bottom of the trench 109c.

Figure 1C:
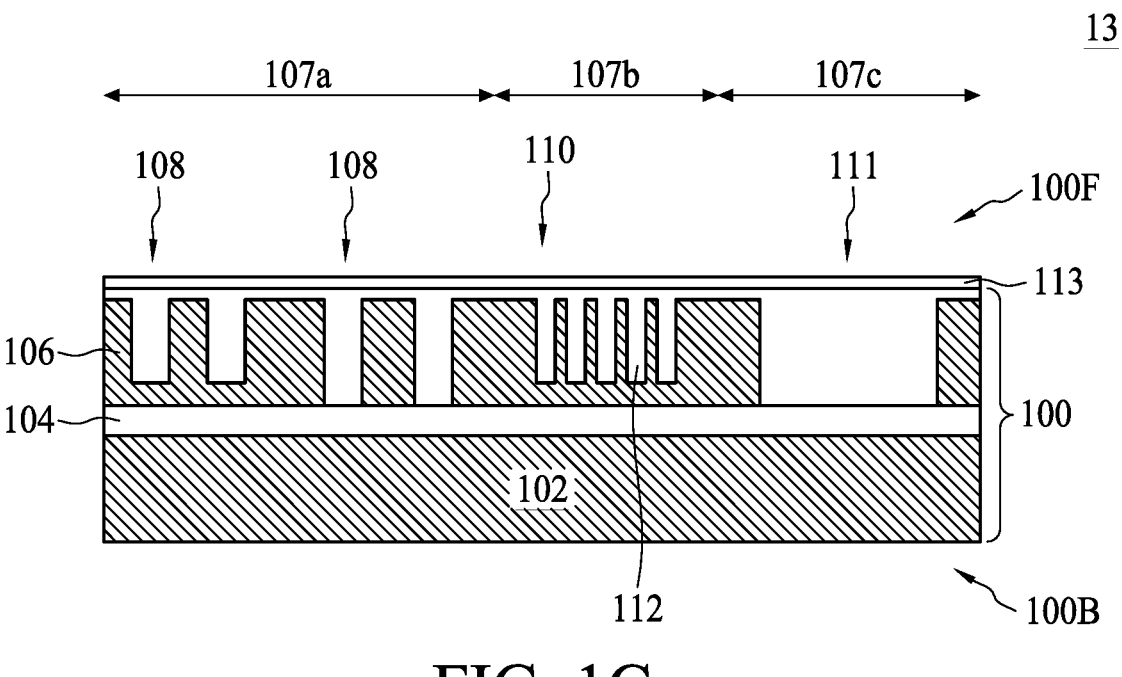

Referring to FIG. 1C, an insulating material is formed to fill the trenches 109a, 109b and 109c. In some embodiments, a planarization operation such as a chemical mechanical polish (CMP) operation is performed to remove excess insulating material, thereby forming a plurality of insulating segments 108 and 112 on the front side 100F of the substrate 100. In some embodiments, the insulating segments 108 formed in the region 107a function as isolations for defining and separating components to be formed in the region 107a. The insulating segments 112 formed in the region 107b are separated from each other and separated from the insulating layer 104 by the semiconductor layer 106. The insulating segments 112 and the semiconductor layer 106 between insulating segments 112 function as a grating coupler 110. In contrast to the insulating segments 108 and 112 formed in the regions 107a and 107b, an insulating structure 111 is formed in the region 107c. As shown in FIG. 1C, a width and a depth of the insulating structure 111 are greater than widths and depths of the insulating segments 108 and 112. In some embodiments, a hard mask layer 113 is formed over the insulating segments 108a and 112 and the insulating structure 111. In some embodiments, the hard mask layer 113 may include silicon nitride, but the disclosure is not limited thereto.

Figure 1D:
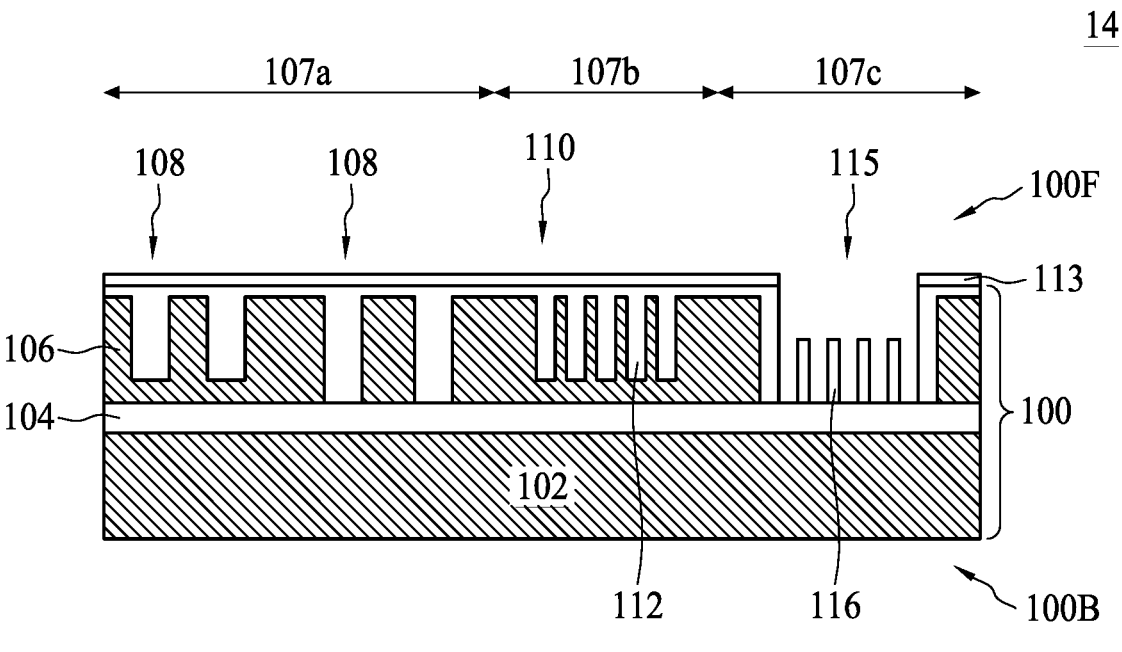

Referring to FIG. 1D, portions of the insulating structure 111 are removed. In such embodiments, the regions 107a and 107b are protected by the hard mask layer 113 during the removal of the portions of the insulating structure 111. In some embodiments, the removal of the portions of the insulating structure 111 includes multiple photolithography and etching operations. Accordingly, another trench 115 is formed in the region 107c, and a plurality of insulating segments 116 are formed and exposed in the trench 115. In some embodiments, the insulating segments 116 are in contact with the insulating layer 104 of the substrate 100. As shown in FIG. 1D, the insulating material is exposed through sidewalls of the trench 115, and portions of the insulating layer 104 are exposed through a bottom of the trench 115. Further, the insulating segments 116 stand in the bottom of the trench 115. A height of the insulating segment 116 is less than a depth of the trench 115. In some embodiments, a width of the insulating segment 116 and the width of the insulating segments 112 are substantially equal. For example, the widths of the insulating segments 112 and 116 are between approximately 0.1 μm and approximately 0.3 μm, but the disclosure is not limited thereto. In some embodiments, a height of the insulating segments 116 and a height of the insulating segments 112 are substantially equal. For example, the heights of the insulating segments 112 and 116 are between approximately 0.2 μm and approximately 0.4 μm, but the disclosure is not limited thereto. In some embodiments, a distance between adjacent insulating segments 112 and a distance between adjacent insulating segments 116 are substantially equal. For example, such distances are between approximately 2 μm and approximately 10 μm, but the disclosure is not limited thereto.

Figure 1E:
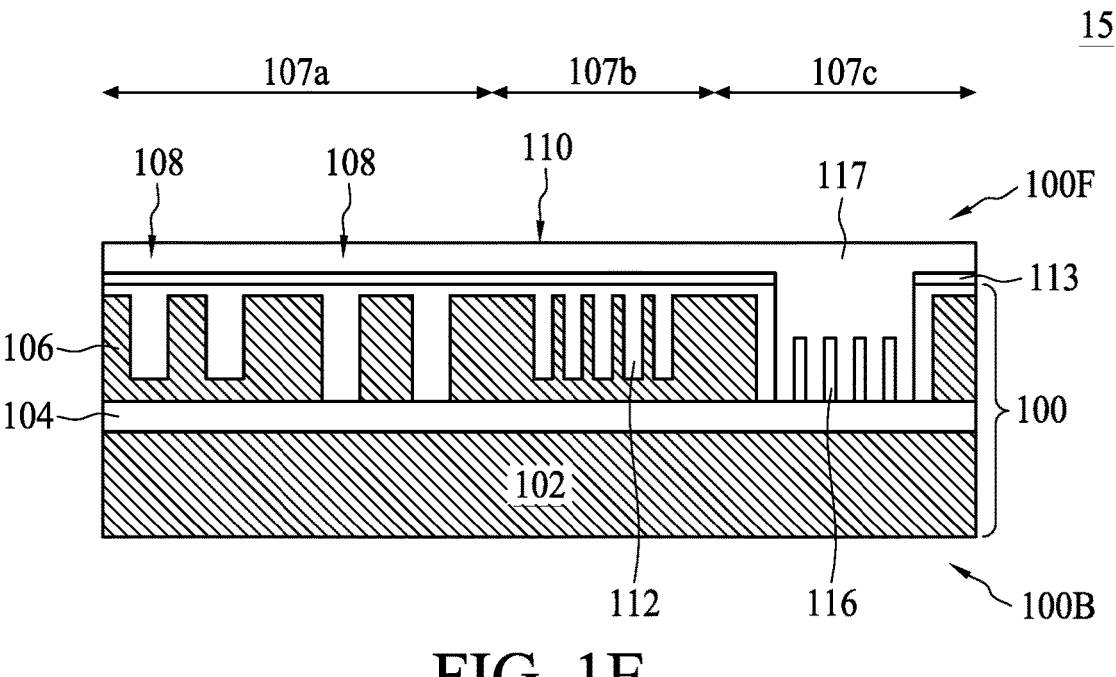

Referring to FIG. 1E, in some embodiments, a semiconductor material 117 is formed to fill the trench 115. As shown in FIG. 1E, the insulating segments 116 are embedded in the semiconductor material 117. In some embodiments, the semiconductor material 117 includes polysilicon, but the disclosure is not limited thereto.

Figure 1F:
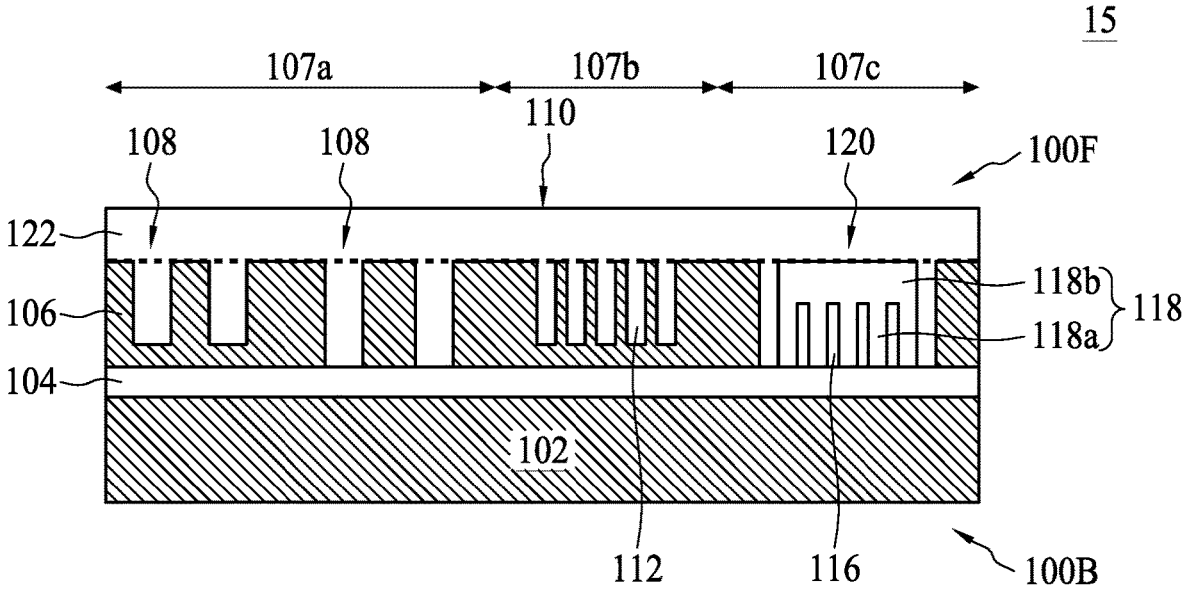

Referring to FIG. 1F, in some embodiments, a planarization such as a CMP operation is performed to remove excess semiconductor material 117 and the hard mask layer 113. Accordingly, a semiconductor structure 118 is formed in the region 107c. As shown in FIG. 1F, the semiconductor structure 118 includes a plurality of teeth 118a and a base 118b coupled to the teeth 118a. Further, the teeth 118a and the insulating segments 116 are alternately arranged, such that the insulating segments 116 are separated from each other by the teeth 118a of the semiconductor structure 118. Additionally, top surfaces of the insulating segments 116 are in contact with the base 118b of the semiconductor structure 118, while bottom surfaces of the insulating segments 116 are in contact with the insulating layer 104. The insulating segments 116 and the semiconductor structure 118 work together and function as a grating coupler 120.

As shown in FIG. 1F, the grating coupler 110 is formed in the region 107b, and the grating coupler 120 is formed in the region 107c. The grating coupler 110 and the grating coupler 120 are separated from each other by the insulating material. Further, it is observed that the grating coupler 120 has a configuration that is inverse to a configuration of the grating coupler 110 due to arrangement of the insulating segments 116. Accordingly, in some embodiments, the grating coupler 120 can be referred to as an inverse grater coupler.

Still referring to FIG. 1F, because the waveguide, photonic components, the grating coupler 110 and the inverse grating coupler 120 are all formed in the semiconductor layer 106, the semiconductor layer 106 may be collectively referred to as a photonic layer. In some embodiments, another insulating layer 122 is formed over the front side 100F of the substrate 100. The insulating layer 122 is formed over the waveguides, the photonic components, the grating coupler 110, and the inverse grating coupler 120. The insulating layer 122 may be formed of one or more layers of silicon oxide, silicon nitride, a combination thereof, or the like, and may be formed by chemical vapor deposition (CVD), physical vapor deposition (PVD), atomic layer deposition (ALD), a spin-on-dielectric process, the like, or a combination thereof. In some embodiments, the insulating layer 122 may be formed by a high-density plasma chemical vapor deposition (HDP-CVD), a flowable CVD (FCVD) (e.g., a CVD-based material deposition in a remote plasma system and subjected post-curing to convert it to another material, such as an oxide), the like, or a combination thereof. Other dielectric materials formed by any acceptable process may be used. In some embodiments, the insulating layer 122 is then planarized using a planarization process such as a CMP process, a grinding process, or the like.

In some embodiments, due to differences in refractive indices of materials of the waveguides (not shown) and the insulating layer 122, the waveguides have high internal reflections such that light is substantially confined within the waveguides, depending on a wavelength of the light and the refractive indices of the respective materials. In an embodiment, the refractive index of the material of the waveguides is greater than the refractive index of the material of the insulating layer 122. For example, the waveguides may include silicon, and the insulating layer 122 may include silicon oxide and/or silicon nitride.

FIGS. 2A to 2F are schematic cross-sectional views of various stages in a formation of a photonic package according to aspects of the present disclosure in one or more embodiments. In some embodiments, FIGS. 2A to 2F show various stages in a formation after the formation of the photonic layer (including the grating coupler 110, the inverse grating coupler 120 and the photonic component 124). The corresponding operations are also reflected schematically in the process flow shown in FIG. 7.

Figure 2A:
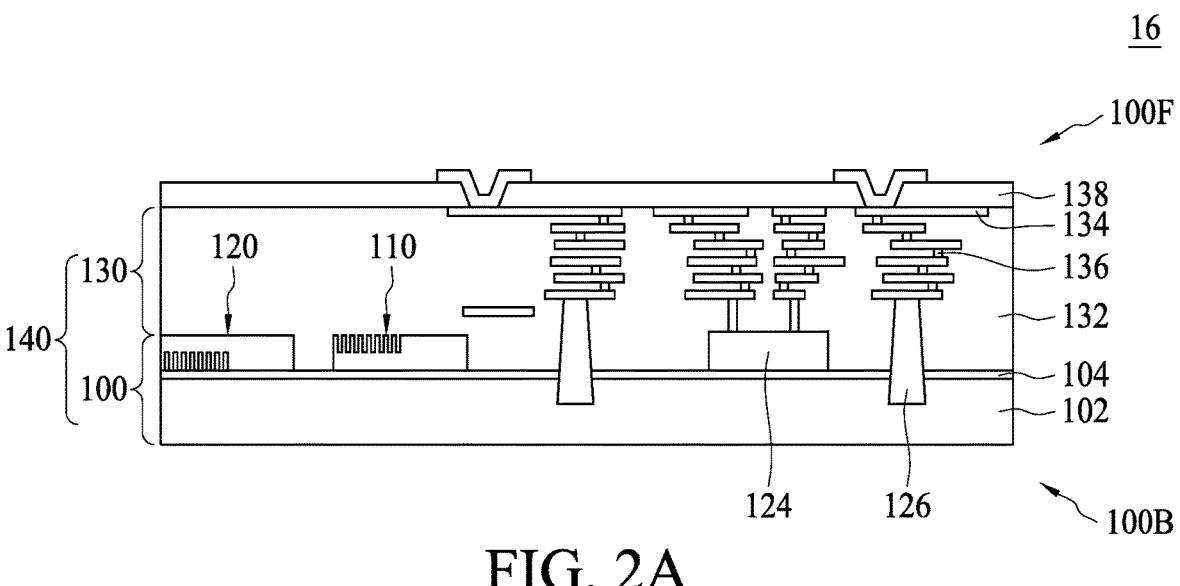
FIG. 2A to 2F are schematic cross-sectional views in various stages in a formation of a photonic package according to aspects of the present disclosure in one or more embodiments.

Referring to FIG. 2A, in some embodiments, at least a through-substrate-via (TSV) 126 is formed in the substrate 100. In some embodiments, an interconnect structure 130 is formed over the semiconductor layer 106 to form an optical die 140. The interconnect structure 130 includes a dielectric structure 132, a plurality of metallization layers 134 disposed in the dielectric structure 132, and a plurality of via 136 electrically connecting the metallization layers 134. In some embodiments, the dielectric structure 132 includes one or more dielectric layers. In some embodiments, the insulating layer 122 may be referred to as a part of the dielectric structure 132; therefore, the insulating layer 122 is omitted from FIG. 2A. A number of the dielectric layers, a number of the metallization layers 134 and a number of the vias 136 shown in FIG. 2A are merely non-limiting examples. Other numbers of the dielectric layers and other numbers of the layers of the metallization features (i.e., the metallization layers 134 and the vias 136) are also possible and are fully intended to be included within the scope of the present disclosure. In some embodiments, a top dielectric layer 138 may be formed over the interconnect structure 130 of the optical die 140.

In some embodiments, the metallization layers 134 and the vias 136 are disposed in portions of the dielectric structure 132 that are outside of portions over the grating coupler 110 and the inverse coupler 120. In other words, above the grating coupler 110 and the inverse grating coupler 120, there is only the dielectric structure 132 of the interconnect structure 130, as shown in FIG. 2A. Still referring to FIG. 2A, the TSV 126 penetrates the substrate 100 and the dielectric structure 132 of the interconnect structure 130. The TSV 126 is coupled to the metallization layers 134 of the interconnect structure 130.

Figure 2B:
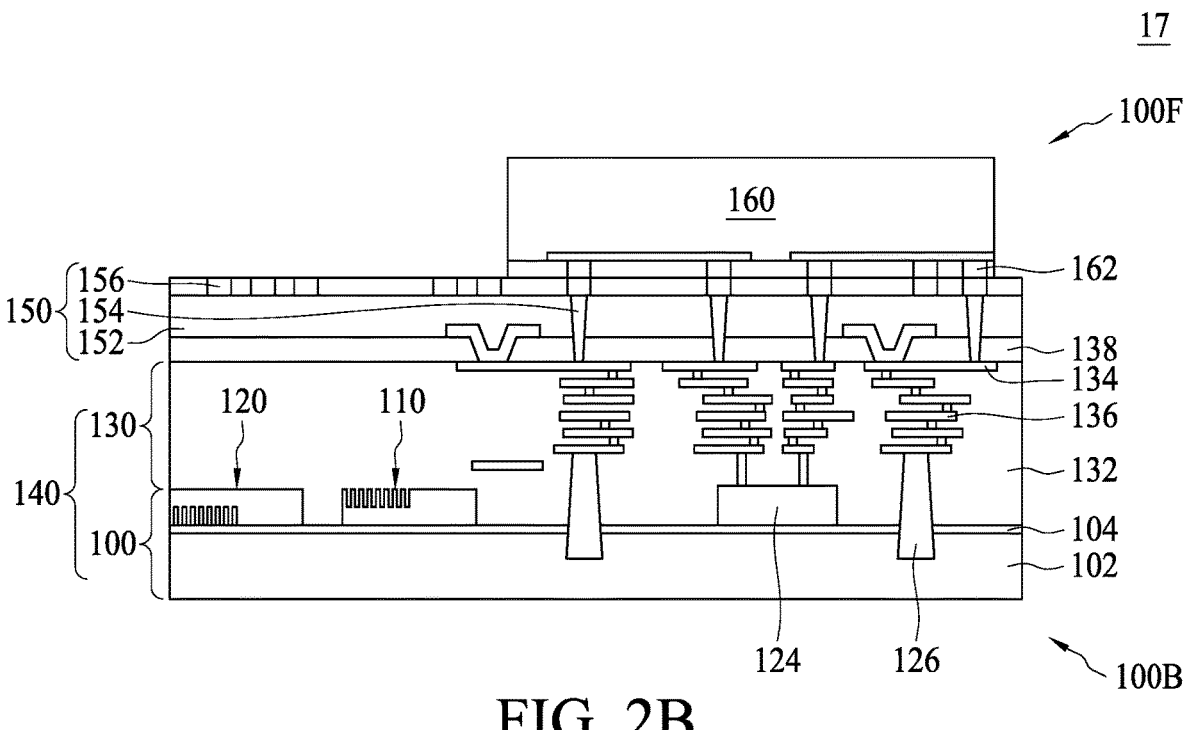

Referring to FIG. 2B, in some embodiments, a redistribution (RDL) structure 150 may be formed over the optical die 140. The RDL structure 150 may include one or more dielectric layers 152 and one or more metallization features 154 including metallization layers and vias in the dielectric layer 152. In some embodiments, the RDL structure 150 further include a plurality of bonding pads 156.

Still referring to FIG. 2B, one or more electronic dies 160 are bonded to the RDL structure 150, in accordance with some embodiments. The electronic die 160 may include, for example, semiconductor devices, dies, or chips that communicate with the photonic components using electrical signals. It should be noted that one electronic die 160 is shown in FIG. 2B, but a photonic package may include two or more electronic dies 160 in other embodiments. In some embodiments, multiple electronic dies 160 may be incorporated into a single photonic package in order to reduce processing cost. The electronic die 160 includes die connectors 162, which may be, for example, conductive pads, conductive pillars, or the like.

The electronic die 160 may include integrated circuits for interfacing with the photonic components, such as circuits for controlling operation of the photonic components. For example, the electronic die 160 may include controllers, drivers, transimpedance amplifiers, the like, or combinations thereof. In some embodiments, the electronic die 160 may also include a CPU. In some embodiments, the electronic die 160 includes circuits for processing electrical signals received from photonic components, such as for processing electrical signals received from a photonic component comprising a photodetector. In some embodiments, the electronic die 160 may control high-frequency signaling of the photonic components according to electrical signals (digital or analog) received from another device or die. In some embodiments, the electronic die 160 may be an electronic integrated circuit (EIC) or the like that provides serializer/deserializer (SerDes) functionality. In such manner, the electronic die 160 may act as part of an I/O interface between optical signals and electrical signals within a photonic package. In some embodiments, the photonic package described herein could be considered system-on-chip (SoC) or system-on-integrated-circuit (SoIC) devices.

In some embodiments, the electronic die 160 is bonded to the RDL structure 150 by dielectric-to-dielectric bonding and/or metal-to-metal bonding (e.g., direct bonding, fusion bonding, oxide-to-oxide bonding, hybrid bonding, or the like). In such embodiments, covalent bonds may be formed between oxide layers, such as the topmost dielectric layer and surface dielectric layers (not shown) of the electronic die 160. During the bonding, metal bonding may also occur between the die connectors 162 of the electronic die 160 and the bonding pads 156 of the RDL structure 150.

Figure 2C:
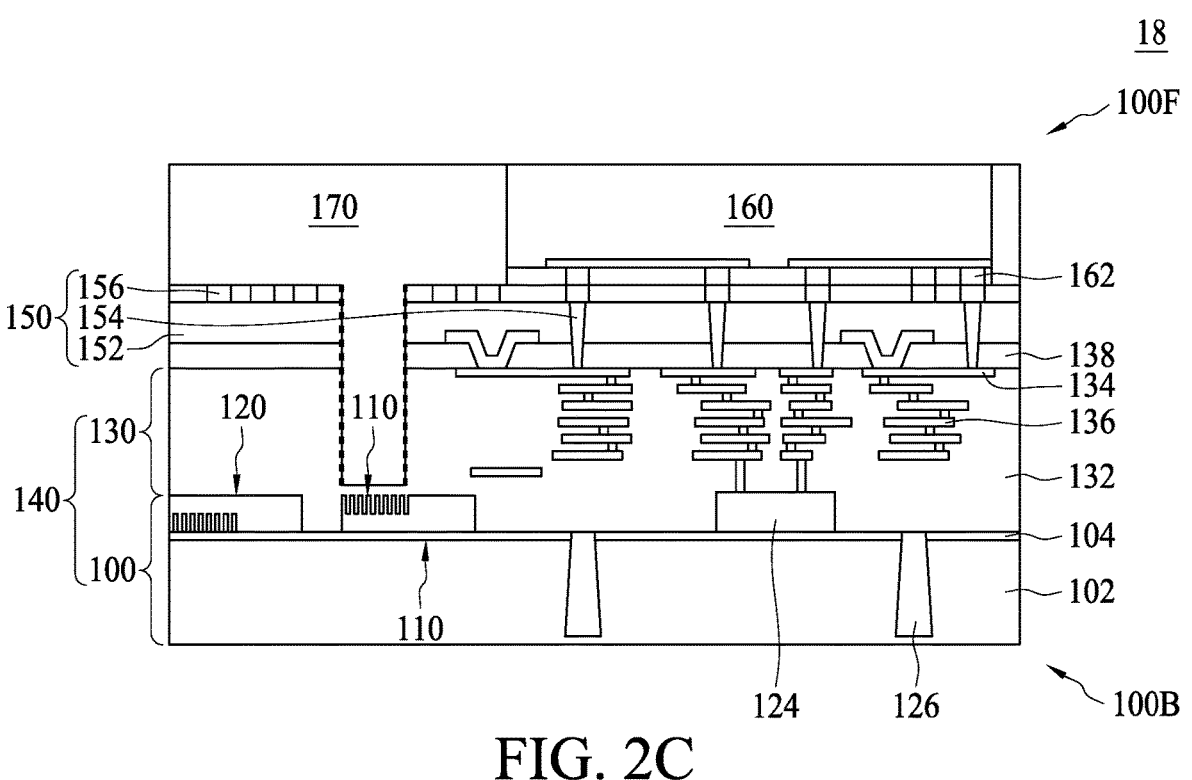

Referring to FIG. 2C, in some embodiments, a dielectric material 170 is formed over the electronic dies 160 and the RDL structure 150, in accordance with some embodiments. The dielectric material 170 may be formed of silicon oxide, silicon nitride, a polymer, the like, or a combination thereof. The dielectric material 170 may be formed by CVD, PVD, ALD, a spin-on-dielectric process, the like, or a combination thereof. In some embodiments, the dielectric material 170 may be formed by HDP-CVD, FCVD, the like, or a combination thereof. In some embodiments, the dielectric material 170 may be a gap-fill material, which may include one or more of the example materials above. The dielectric material 170 may be planarized using a planarization operation such as a CMP operation, a grinding operation, or the like. In some embodiments, the planarization operation may expose the electronic die 160 such that top surfaces of the electronic dies 160 and a top surface of the dielectric material 170 are aligned (i.e., coplanar) with each other.

In some embodiments, the dielectric material 170 may be a material that is substantially transparent to light at wavelengths suitable for transmitting optical signals or optical power between the grating coupler 110 and a vertically-mounted optical fiber. For example, the dielectric material 170 may be formed of a suitably transparent material such as silicon oxide. The use of a suitably transparent material for the dielectric material 170 in such manner allows optical signals to be transmitted through the dielectric material 170, such as optical signals transmitted between the grating coupler 110 and the vertically-mounted optical fiber (not shown) located above the dielectric material 170. Additionally, in some embodiments, a trench may be formed in the dielectric layers 152, the top dielectric layer 138, and the dielectric structure 132 of the interconnect structure 130 prior to the forming of the dielectric material 170. In such embodiments, the trench is filled with the dielectric material 170, as shown in FIG. 2C. Consequently, a transparent path may be formed directly over the grating coupler 110 for further improving transmission of the optical signals or the optical power to the grating coupler 110.

Additionally, with the bonding of the electronic die 160 to the RDL structure 150 in such manner, a thickness of the resulting photonic package may be reduced, and an optical coupling between the grating coupler 110 and the vertically-mounted optical fiber may be improved. In some cases, such improvement this can reduce a size or a processing cost of the photonic package, and optical coupling to external components may be improved.

Figure 2D:
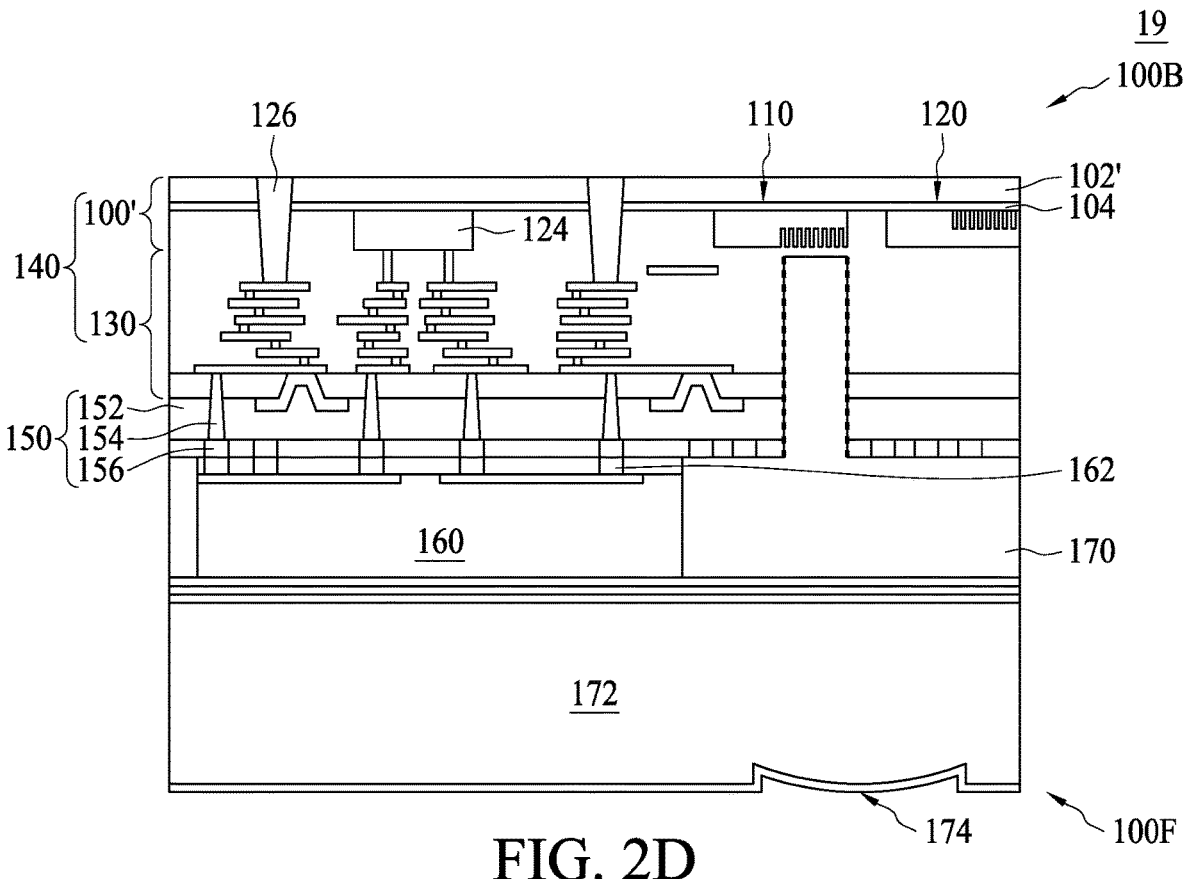

Referring to FIG. 2D, in some embodiments, a support substrate 172 is provided. The support substrate 172 is a rigid structure that provides structural or mechanical stability. The use of the support substrate 172 can reduce warping or bending, which can improve the performance of the optical structures such as the waveguides or the photonic components. In some embodiments, the support substrate 172 is therefore referred to as a protective substrate. The protective substrate 172 may include one or more materials such as silicon (e.g., a silicon wafer, bulk silicon, or the like), a silicon oxide, a metal, an organic core material, the like, or another type of material. The protective substrate 172 may be attached to the dielectric material 170 and/or the electronic die 160 using an adhesive layer, or the protective substrate 172 may be attached using direct bonding or another suitable technique. In some embodiments, the protective substrate 172 may have a thickness between about 500 μm and about 900 μm, but the disclosure is not limited thereto. In some embodiments, a lens 17458 may be formed over a surface of the protective substrate 172 opposite to the electronic die 160 and the dielectric material 170. In such embodiments, the lens 174 is formed overlapping at least the grating coupler 110, thereby further improving transmission of the optical signals or the optical power to the grating coupler 110.

Still referring to FIG. 2D, in some embodiments, the optical die 140, the electronic die 160, the dielectric material 170 and the protective substrate 172 are flipped over. In some embodiments, a portion of the substrate 100, (i.e., the bulk substrate 102) is removed. The removal of the portion of the substrate 100 can include a planarization such as a CMP or a grinding operation, an etching process, a combination thereof, or the like. In some embodiments, the bulk substrate 102 is thinned to form a thinned bulk substrate 102'. In some embodiments, the bulk substrate 102 may be entirely removed to expose the insulating layer 104. In other embodiments, the insulating layer 104 may be thinned. Accordingly, a die substrate 100' is obtained, as shown in FIG. 2D.

Still referring to FIG. 2D, the removal of the portion of substrate 100 exposes the TSVs 126 from the back side 100B of the substrate 100. As mentioned above, the TSVs 126 are electrically connected to the interconnect structure 130. Accordingly, an electrical connection between the back side 100B of the optical die 140 and the electronic die 160, which is disposed over the front side 100F of the optical die 140, is formed.

Figures 2E, 2F:
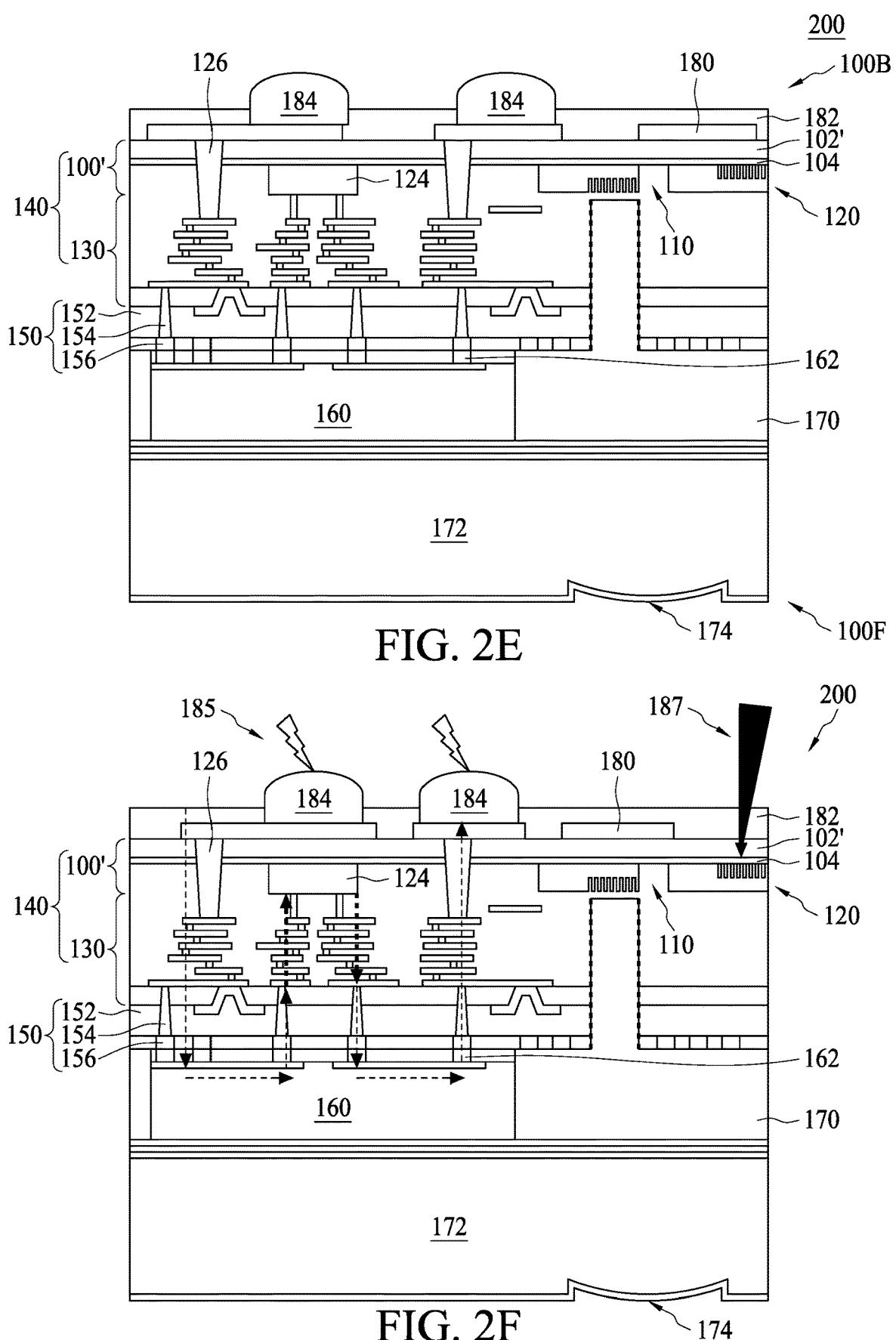

Referring to FIG. 2E, in some embodiments, a plurality of conductive pads 180 are formed over the back side 100B of the die substrate 100'. Further, the conductive pads 180 are coupled to the TSVs 176. The conductive pads 180 may be aluminum pads or aluminum-copper pads, although other metallic pads may be used.

After the forming of the conductive pads 180, a passivation layer 182 is formed over the back side 100B of the die substrate 100' of the optical die 140. The passivation layer 182 covers the conductive pads 180. The passivation layer 182 may be formed from a dielectric material, such as silicon oxide, silicon nitride, the like, or a combination thereof. In some embodiments, openings (not shown) are formed in the passivation layer 182 to expose a portion of each conductive pad 180. In some embodiments, under-bump metallizations (UBM) (not shown) maybe formed on the conductive pads 180 and the passivation layer 182. The UBM may be formed by forming a blanket conductive layer on the passivation layer 182 and in the openings, such as by electroplating. The conductive layer may be formed from copper, a copper alloy, silver, gold, aluminum, nickel, the like, or combinations thereof. The conductive layer may be patterned to form the UBM.

Still referring to FIG. 2E, external terminals 184 are formed on the UBM and the conductive pads 180. The external terminals 184 may be ball grid array (BGA) connectors, solder balls, metal pillars, controlled collapse chip connection (C4) bumps, micro bumps, electroless nickel-electroless palladium-immersion gold technique (EMEPIG) formed bumps, or the like. The external terminals 184 may include a conductive material such as solder, copper, aluminum, gold, nickel, silver, palladium, tin, the like, or a combination thereof. In some embodiments, the external terminals 184 are formed by initially forming a layer of solder through commonly used methods such as evaporation, electroplating, printing, solder transfer, ball placement, or the like. Once a layer of solder has been formed on the structure, a reflow may be performed in order to shape the solder into desired bump shapes. In another embodiment, the external terminals 184 are metal pillars (such as copper pillars) formed by sputtering, printing, electro plating, electroless plating, CVD, or the like. The metal pillars may be solder free and have substantially vertical sidewalls. In some embodiments, a metal cap layer (not shown) is formed on a top of the external terminals 184. The metal cap layer may include nickel, tin, tin-lead, gold, silver, palladium, indium, nickel-palladium-gold, nickel-gold, the like, or a combination thereof and may be formed by a plating process. Accordingly, a wafer-level photonic package is obtained.

Referring to FIG. 2F, in some embodiments, after the forming of the external terminals 184, an electrical test 185 and an optical test 187 can be performed. The electrical test 185 and the optical test 187 are performed on a same side of the optical die 140. In some embodiments, probes for the electrical test 185 may be in contact with the external terminal 184 on the back side 100B of the die substrate 100', such that electrical signals may be transferred in a closed circuit as depicted by arrows shown in FIG. 2F. In some embodiments, the optical signal can be input through the back side 100B of the die substrate 100' through the inverse grating coupler 120. Because both the electrical test 185 and the optical test 187 are performed on the same side, test operations can be simplified and time can be saved.

Figures 3, 4:
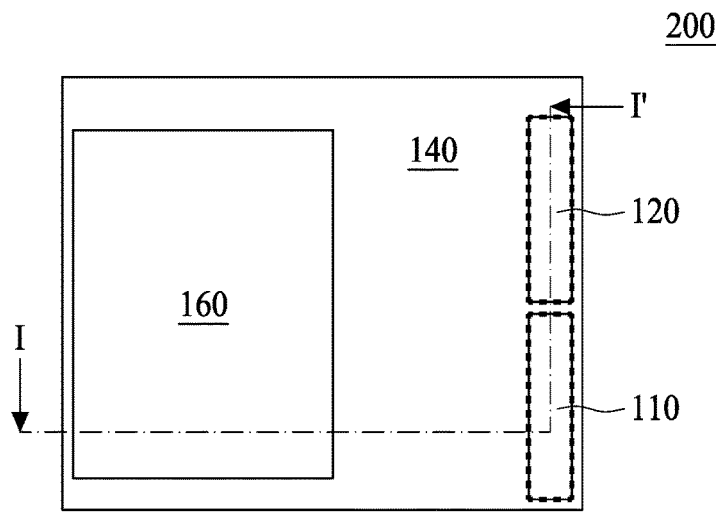
FIG. 3 is a top view of a photonic package according to aspects of the present disclosure in one or more embodiments.
FIG. 4 is a schematic cross-sectional view taken along line I-I' of FIG. 3.

Please refer to FIGS. 3 and 4, wherein FIG. 3 is a top view of a portion of a photonic package 200, and FIG. 4 is a cross-sectional view taken along line I-I' of FIG. 3. In some embodiments, the photonic package 200 includes an optical die 140 and an electronic die 160 bonded to the optical die 140. As shown in FIG. 3, in some embodiments, an area of the electronic die 160 is less than an area of the optical die 140, but the disclosure is not limited thereto.

Referring to FIG. 4, the optical die 140 includes a die substrate 100'. The die substrate 100' has a front side 100F and a back side 100B. The optical die 140 further includes a grating coupler 110, an inverse grating coupler 120, and an interconnect structure 130. The grating coupler 110 includes a plurality of insulating segments 112 facing toward and in contact with the interconnect structure 130, while the inverse grating coupler 120 includes a plurality of insulating segments 116 facing toward the back side 100B of the die substrate 100' and separated from the interconnect structure 130 by a semiconductor structure 118. As mentioned above, the insulating segments 112 and the insulating segments 116 include a same material. In some embodiments, an RDL structure 150 may be disposed between the optical die 140 and the electronic die 160. The optical die 140 and the electronic die 160 are electrically connected to each other through the RDL structure 150 and the interconnect structure 130.

The photonic package 200 further includes a plurality of external terminals 184 disposed over the back side 100B of the die substrate 100' of the optical die 140. The external terminals 184 provide electrical connections between the photonic package 200 and other devices/packages. Further, in some embodiments, as shown in FIG. 4, the electronic die 160 is electrically connected to the external terminals 184 through the RDL structure 150, the interconnect structure 130, TSVs 176 and pads 180.

The photonic package 200 further includes a dielectric material 170 surrounding the electronic die 160. Each of the electronic die 160 and the dielectric structure 170 has a first surface facing the optical die 140 and a second surface opposite to the first surface. In some embodiments, the second surface of the electronic die 160 and the second surface of the dielectric structure 170 are aligned (i.e., coplanar) with each other.

The photonic package 200 further includes a protective substrate 172 disposed over the second surface of the electronic die 160 and the second surface of the dielectric structure 170. In some embodiments, the protective substrate 172 includes at least a lens 174 overlapping at least the grating coupler 110. The lens 174 helps focus light toward the grating coupler 110. In such embodiments, electronic signals and optical signals may be input or output from opposite sides of the photonic package 200.

Figure 5:
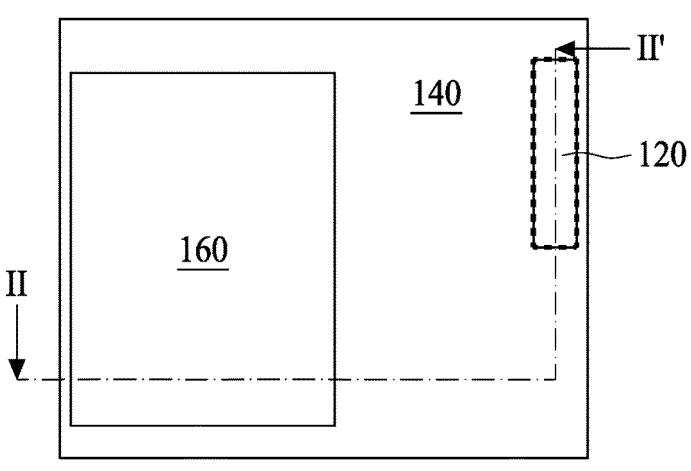
FIG. 5 is a top view of a photonic package according to aspects of the present disclosure in one or more embodiments.
Figure 6:
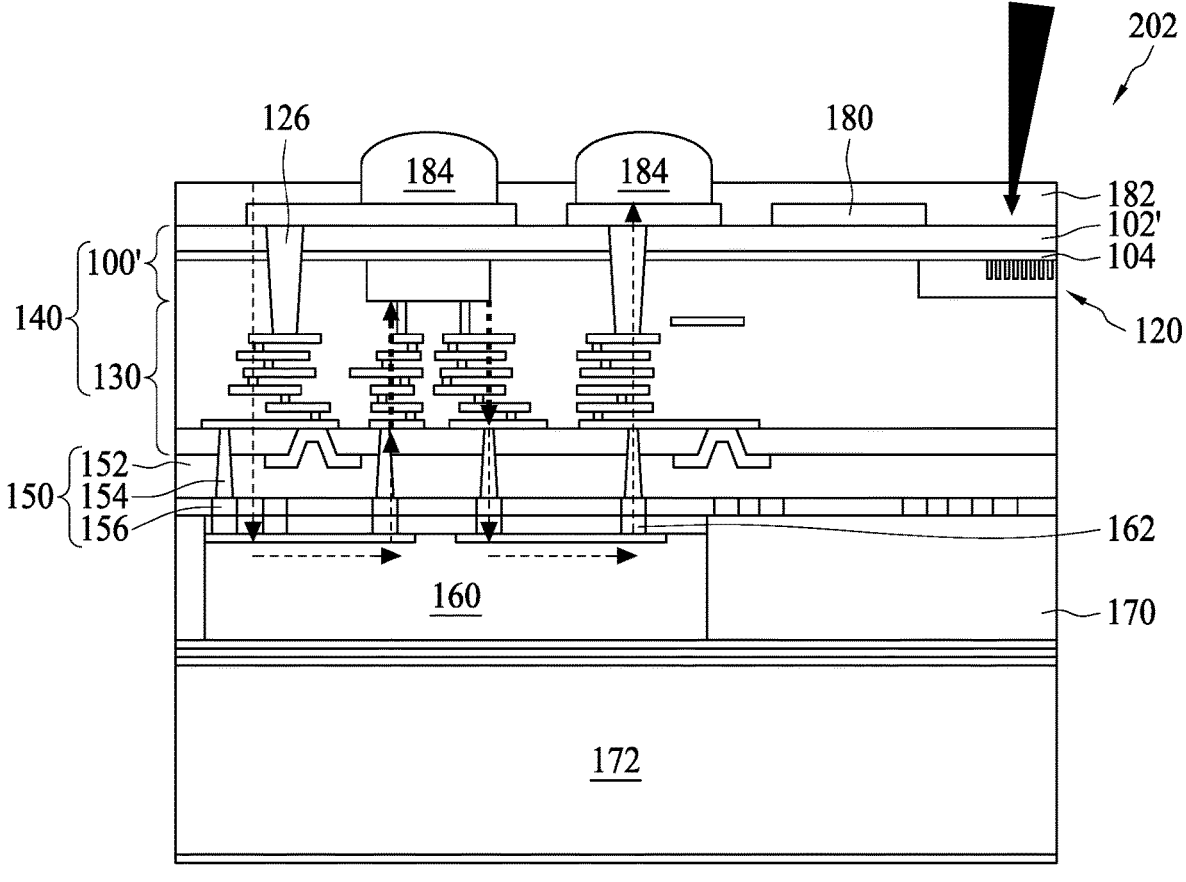
FIG. 6 is a schematic cross-sectional view taken along line II-II' of FIG. 5.

Referring to FIGS. 5 and 6, FIG. 5 is a top view of portion of a photonic package 202, and FIG. 6 is a cross-sectional view taken along line II-II' of FIG. 5. It should be noted that same elements in FIGS. 3 and 4 and FIGS. 5 and 6 are designated by same numerals, and may include same materials; therefore, repeated descriptions are omitted for brevity.

In some embodiments, the photonic package 202 includes a grating coupler 120 having a plurality of segments 116 in contact with an insulating layer 104 of a die substrate 100'. In such embodiments, a protecting substrate 172 may have a flat surface and is free of a lens. Further, in such embodiments, electrical signals and optical signals are input from a same side of the photonic package 202.

Referring to FIG. 7, a method for forming a photonic package 30 is provided. While the disclosed method 30 is illustrated and described herein as a series of acts or operations, it will be appreciated that an order of the illustrated acts or operations is not to be interpreted in a limiting sense. For example, some operations may be performed in different order and/or concurrently with other acts or operations apart from those illustrated and/or described herein. In addition, not all illustrated operations may be required to implement one or more aspects or embodiments of the invention described herein. Further, one or more of the operations described herein may be carried out in one or more separate operations and/or phases.

In operation 31, a substrate 100 is received. FIG. 1A illustrates a cross-sectional view of an intermediate photonic package 11 according to some embodiments corresponding to operation 31. The substrate 100 may be an SOI substrate including a bulk substrate 102, an insulating layer 104 and a semiconductor layer 106. The substrate 100 has a front side 100F and a back side 100B. In some embodiments, the semiconductor layer 106 faces toward the front side 100F, while the bulk substrate 102 faces toward the back side 100B. In some embodiments, the substrate 100 has a plurality of regions for accommodating various devices or components. For example, the substrate 100 may have a first region 107b, a second region 107c and a third region 107a.

In operation 32, a plurality of first trenches 109b are formed in the first region 107b and a second trench 109c is formed in the second region 107c. In some embodiments, a plurality of third trenches 109a are formed in the third region 107a. FIG. 1B illustrates a cross-sectional view of an intermediate photonic package 12 according to some embodiments corresponding to operation 32. As shown in FIG. 1B, a depth and a width of each first trench 109b are less than a depth and a width, respectively, of the second trench 109c. In some embodiments, the semiconductor layer 106 is exposed through bottoms of the first trenches 109b, while the insulating layer 104 is exposed through a bottom of the second trench 109c.

In operation 33, a plurality of first insulating segments 112 are formed in the first trenches 109b and an insulating structure 111 is formed in the second trench 109c. FIG. 1C illustrates a cross-sectional view of an intermediate semiconductor package structure 13 according to some embodiments corresponding to operation 33. In some embodiments, the first insulating segments 112 are separated from the insulating layer 104 and separated from each other by the semiconductor layer 106. In some embodiments, the first insulating segments 112 and portions of the semiconductor layer 106 between adjacent insulating segments 112 work together to form a grating coupler 110. Further, a width and a depth of the insulating structure 111 are greater than a width and a depth, respectively, of each first insulating segment 112. Additionally, a plurality of insulating segments 108 may be formed in the third region 107a, and function as isolations.

In operation 34, portions of the insulating structure 111 are removed to form a third trench 115 in the second region 107c and a plurality of second insulating segments 116 in the third trench 115. FIG. 1D illustrates a cross-sectional view of an intermediate photonic package 14 according to some embodiments corresponding to operation 34. As shown in FIG. 1D, the second insulating segments 116 stand in the third trench 115, and portions of the insulating layer 104 are exposed through a bottom of the third trench 115. In some embodiments, a width and a height, respectively, of each second insulating segment 116 are substantially similar to the width and a height of each first insulating segment 112. Further, a distance between adjacent second insulating segments 116 is substantially similar to a distance between adjacent first insulating segments 112.

In operation 35, a semiconductor structure 118 covering the second insulating segments 116 is formed. FIGS. 1E and 1F illustrate cross-sectional views of an intermediate photonic package 15 according to some embodiments corresponding to operation 35. As shown in FIG. 1E, a semiconductor material 117 is formed to fill the third trench 115 and embed the second insulating segments 116. As shown in FIG. 1F, a CMP may be performed to remove superfluous semiconductor material 117, thereby forming the semiconductor structure 118. In some embodiments, the second insulating segments 116 and the semiconductor structure 118 function as a grating coupler 120. In some embodiments, the grating coupler 120 has a configuration that is inverse to that of the grating coupler 110; therefore, the grating coupler 120 may be referred to as an inverse grating coupler 120.

In operation 36, at least a photonic component 124 is formed in the substrate 100 according to some embodiments corresponding to operation 36. FIG. 2A illustrates a cross-sectional view of an intermediate photonic package 16 according to some embodiments corresponding to operation 36.

In operation 37, an interconnect structure 130 is formed over the substrate 100 to form an optical die 140. FIG. 2A illustrates the cross-sectional view of the intermediate photonic package 16 according to some embodiments corresponding to operation 37. The interconnect structure 130 is formed over the front side 100F of the substrate 100. In some embodiments, the interconnect structure 130 is electrically connected to the photonic component 124.

In operation 38, an electronic die 160 is bonded to the optical die 140. FIG. 2B illustrates a cross-sectional view of an intermediate photonic package 17 according to some embodiments corresponding to operation 38. In some embodiments, an RDL structure 150 may be formed over the interconnect structure 130 of the optical die 140 prior to the bonding of the electronic die 160. In such embodiments, the electronic die 160 is electrically connected to the optical die 140 through the RDL structure 150 and the interconnect structure 130.

Referring to FIG. 2C, which is a cross-sectional view of an intermediate photonic package 18 according to further operations of some embodiments, a dielectric material 170 is formed over the RDL structure 150. In some embodiments, a top surface of the dielectric material 170 and a top surface of the electronic die 160 are aligned with each other.

Referring to FIG. 2D, which is a cross-sectional view of an intermediate photonic package 19 according to further operations of some embodiments, a supporting wafer functioning as a protective substrate 172 is bonded to the intermediate photonic package 18. In some embodiments, the protective substrate 172 may include a lens 174 overlapping at least the grating coupler 110. In some embodiments, the intermediate photonic package 19 is flipped over after the bonding of the protective substrate 172. The substrate 100 is then thinned down, and a plurality of TSV 176 are formed in the optical die 140.

Referring to FIG. 2E, which is a cross-sectional view of an intermediate photonic package 200 according to further operations of some embodiments, a plurality of external terminals 184 are formed over the back side of the substrate 100' of the optical die 140.

Referring to FIG. 2F, which is a cross-sectional view of in intermediate photonic package 200 according to further operations of some embodiments, electrical and optical tests 185 and 187 are performed on the photonic package 200.

The present disclosure provides photonic packages and methods of forming the photonic packages. In some embodiments, the photonic package includes a grating coupler for optical signal transmission, and includes an inverse grating coupler for conducting an optical testing. In such embodiments, the optical test and an electrical test can be performed on a same side of the photonic package, such that test operations may be streamlined and simplified. In some comparative approaches without the inverse grating coupler, the optical test and the electrical test are performed on different sides of a comparative photonic package, which consumes extra time and complicates the test operations.

In some embodiments, a photonic package is provided. The photonic package includes an optical die and an electronic die. The optical die has a first side and a second side opposite to the first side. The optical die includes a first grating coupler, a second grating coupler separated from the first grating coupler, and an interconnect structure disposed over the first side. The first grating coupler includes a plurality of first segments disposed over the first side, and the second grating coupler includes a plurality of second segments disposed over the first side. The first segments and the second segments include a same material. The interconnect structure is disposed between the electronic die and the optical die. The optical die and the electronic die are electrically connected to each other through the interconnect structure. The first segments of the first grating coupler are in contact with the interconnect structure, and the second segments of the second grating coupler are separated from the interconnect structure.

In some embodiments, a photonic package is provided. The photonic package includes an optical die, an interconnect structure, a grating coupler, and at least an external terminal. The optical die includes a die substrate having a first side and a second side opposite to the first side. The interconnect structure is disposed on the first side of the die substrate of the optical die. The grating coupler is disposed between the interconnect structure and the die substrate of the optical die. The grating coupler includes a plurality of insulating segments in contact with the die substrate of the optical die. The external terminal is disposed over the second side of the die substrate of the optical die.

In some embodiments, a method for forming a photonic package is provided. The method includes following operations. A substrate is received. The substrate has a first region and a second region. A plurality of first trenches are formed in the first region, and a second trench is formed in the second region. A width of the second trench is greater than a width of each first trench. A plurality of first insulating segments are formed in the first trenches, and an insulating structure is formed in the second trench. Portions of the insulating structure are removed to form a third trench in the second region, and a plurality of second insulating segments are formed in the third trench. A semiconductor structure is formed to cover the second insulating segments. The second insulating segments are separated from each other by the semiconductor structure. At least a photonic component is formed in the substrate.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming a photonic package, comprising:
   receiving a substrate having a first region and a second region;
   forming a plurality of first trenches in the first region and a second trench in the second region, wherein a width of the second trench is greater than a width of each first trench;
   forming a plurality of first insulating segments in the first trenches and an insulating structure in the second trench;
   removing portions of the insulating structure to form a third trench in the second region and a plurality of second insulating segments in the third trench;
   forming a semiconductor structure covering the second insulating segments, wherein the second insulating segments are separated from each other by the semiconductor structure; and
   forming at least a photonic component in the substrate.

2. The method of claim 1, wherein the substrate comprises an insulating layer and a semiconductor layer disposed over the insulating layer.

3. The method of claim 2, wherein the insulating layer is exposed through a bottom of the second trench.

4. The method of claim 1, further comprising forming an interconnect structure over the substrate to form an optical die.

5. The method of claim 4, further comprising bonding an electronic die to the optical die.

6. A method for forming a photonic package, comprising:
   receiving a substrate having a first region and a second region;
   forming a plurality of first insulating segments in the first region;
   forming a plurality of second insulating segments in the second region;
   forming a semiconductor structure coupled to top surfaces of the second insulating segments, wherein the second insulating segments are separated from each other by the semiconductor structure;

forming an insulating layer over the semiconductor structure and the first insulating segments, wherein a bottom surface of the insulating layer is coupled to a top surface of the semiconductor structure and top surfaces of the first insulating segments;

forming at least a photonic component in the substrate.

7. The method of claim 6, wherein the forming of the first insulating segments comprises:

forming a plurality of first trenches in the first region;

filling the first trenches with an insulating material; and performing a planarization operation to remove excess insulating material to form the first insulating segments.

8. The method of claim 6, wherein the top surfaces of the second insulating segments are lower than the top surfaces of the first insulating segments.

9. The method of claim 6, wherein the top surface of the semiconductor structure is aligned with the top surfaces of the first insulating segments.

10. The method of claim 6, further comprising forming an interconnect structure over the substrate to form an optical die.

11. The method of claim 10, further comprising forming a redistribution structure over the interconnect structure.

12. The method of claim 10, further comprising bonding an electronic die to the optical die.

13. The method of claim 12, further comprising forming a dielectric material over the optical die, wherein a top surface of the dielectric material is aligned with a top surface of the optical die.

14. The method of claim 13, further comprising attaching the dielectric material and the electrical die to a support substrate.

15. The method of claim 14, further comprising forming a lens over a surface of the support substrate opposite to the electronic die and the dielectric material.

16. A method for forming a photonic package, comprising:

receiving a substrate having a first region and a second region;

forming a plurality of first insulating segments in the first region;

forming a plurality of second insulating segments in the second region, wherein top surfaces of the first insulating segments are higher than top surfaces of the second insulating segments, and bottom surfaces of the first insulating segments are lower than the top surfaces of the second insulating segments;

forming a semiconductor structure covering the second insulating segments, wherein the top surfaces of the first insulating segments are aligned with a top surface of the semiconductor structure;

forming at least a photonic component in the substrate.

17. The method of claim 16, wherein the forming of the second insulating segments comprises:

forming a trench in the second region;

filling the trench with an insulating material; and patterning the insulating material to form the second insulating segments.

18. The method of claim 16, wherein the substrate comprises a semiconductor layer and an insulating layer.

19. The method of claim 18, wherein the first insulating segments are separated from the insulating layer by the semiconductor layer.

20. The method of claim 18, wherein the second insulating segments are coupled to the insulating layer.

\* \* \* \* \*